March 18, 1930.  R. A. FREUNDLICH  1,751,273
DISPLAY FIGURE AND METHOD OF MAKING SAME
Filed July 20, 1929
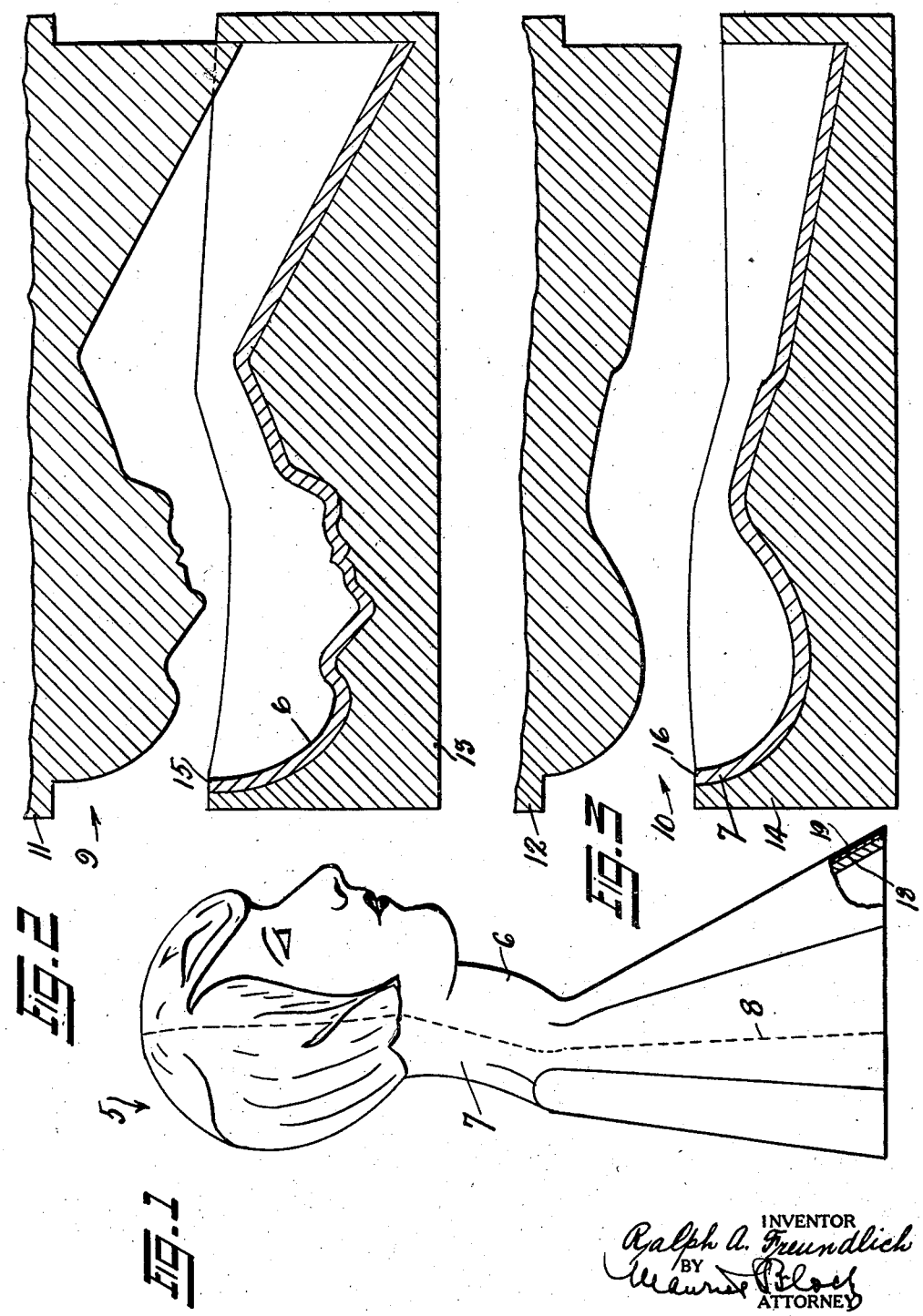

Patented Mar. 18, 1930

1,751,273

UNITED STATES PATENT OFFICE

RALPH A. FREUNDLICH, OF BROOKLYN, NEW YORK

DISPLAY FIGURE AND METHOD OF MAKING SAME

Application filed July 20, 1929. Serial No. 379,711.

This invention relates to display figures and method of making same, and has for one of its objects the provision of a figure of the character referred to, made of a wood pulp composition which will be light and durable and will present a smooth exterior surface for decorative purposes.

Other objects and novel features of my invention will become more apparent as the specification proceeds, the invention consisting substantially of a figure made of a novel combination of ingredients, and in the method of producing same herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the accompanying drawings, Figure 1 is a side view in elevation, partly in section, of one form of display figure made according to my invention;

Figure 2 is a sectional view of a portion of the die for forming the front portion of the figure, and Figure 3 is a similar view to Figure 2 of the die forming the rear portion of the figure.

Referring to the drawings in detail 5 indicates a display figure in the form of a bust formed of a front section 6 and a rear section 7 and joined along a line 8 in a manner hereinafter fully described.

The figure is preferably made of a wood pulp composition of the following ingredients and proportions: one hundred pounds of wood pulp, one hundred pounds of corn starch, twenty-five pounds of powdered rosin, and one hundred pounds of water. The entire composition is thoroughly mixed for approximately one half an hour, the water dampening the entire mass without making a paste thereof. The composition is then put into an agitator and allowed to pass through a sieve of one half an inch mesh so as to break up any large lumps that may exist therein, after which the composition is ready to be poured into molds.

In the present instance I provide molds 9 and 10 comprising male portions 11 and 12 and female portions 13 and 14 respectively. Into each of the female portions I pour a suitable quantity of the mixture and press same into form by means of the male portions 11 and 12 which pressing operation lasts for about ten minutes. Both the male and female portions of the molds may either be preheated by exterior means or may have a heating unit built in them so as to thoroughly expel all the moisture of the composition and solidify same. After the two halves of the figure are thus formed they are removed from the molds and their edges 15 and 16 are coated with glue and the said halves are tied together until pasted.

After the figure is pasted together it is dipped into a preparation or bath consisting of the following ingredients in approximately the following proportions: one hundred and fifty lbs. of hard glue in flakes, one hundred and twenty-five lbs. of water, seventy-five lbs. of white lead, twenty-five lbs. of French zinc white, two and one-half gallons of glycerine and one gallon of cottonseed oil, which will produce a protective coating 18 on the figure.

In order to make this composition more effective, the glue is first softened in one hundred lbs. of cold water for twelve hours and then heated to 150° Farenheit, after which the white lead and cotton seed oil is added and thoroughly mixed, then the zinc, dissolved in twenty-five lbs. of water, is added and thoroughly mixed for about one hour, and finally the glycerine is added and the entire mixture agitated for about one half an hour. The figure is then left to dry for twenty-four hours after which it is sprayed with a coating of lacquer to provide a smooth surface 19 for decorating purposes. The glycerine prevents the protective coat from drying too rapidly and the consequent cracking of same.

While I have illustrated and described a display figure in the form of a bust, I desire it distinctly understood that I do not limit myself to this form, as I may produce a display figure having a full body with legs and arms, the said legs and arms also being made in two halves. Likewise instead of a hollow display figure I may if desired make same solid.

From the foregoing, it will be seen that I have produced a light and durable display figure made of a wood pulp composition hitherto unknown and the process for making same.

Having described my invention what I claim as new and desire to secure by Letters Patent is—

1. A display figure or the like, provided with a coating, comprising glue, white lead, French zinc, glycerine and cottonseed oil in about the proportions specified.

2. A step in the manufacture of wood pulp display figures, which consists in subjecting the figure to a glutinous bath, the said bath consisting of a mixture of glue, white lead, French zinc, glycerine, cottonseed oil, and water in about the proportions specified.

RALPH A. FREUNDLICH.